United States Patent
Schneider et al.

(10) Patent No.: US 7,141,618 B2
(45) Date of Patent: *Nov. 28, 2006

(54) COATING COMPOSITIONS WITH MODIFIED PARTICLES AND METHODS OF USING THE SAME

(75) Inventors: John R. Schneider, Glenshaw, PA (US); Daniela White, Pittsburgh, PA (US); Anthony M. Chasser, Allison Park, PA (US); James B. O'Dwyer, Valencia, PA (US); Thomas R. Hockswender, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 557 days.

This patent is subject to a terminal disclaimer.

(21) Appl. No.: 10/161,509

(22) Filed: Jun. 3, 2002

(65) Prior Publication Data

US 2003/0229157 A1     Dec. 11, 2003

(51) Int. Cl.
    *C08K 9/06*     (2006.01)
    *C08K 3/00*     (2006.01)

(52) U.S. Cl. .................. 523/212; 523/213; 524/492; 524/904; 525/931; 525/934

(58) Field of Classification Search ............. 523/212, 523/213; 524/492, 904; 525/934, 931
See application file for complete search history.

(56) References Cited

U.S. PATENT DOCUMENTS

| | | | |
|---|---|---|---|
| 4,061,503 A | 12/1977 | Berger et al. ............... 106/300 |
| 4,151,154 A | 4/1979 | Berger ....................... 260/40 R |
| RE30,450 E | 12/1980 | Iannicelli ................. 106/308 N |
| 4,247,708 A | 1/1981 | Tsutumi et al. .............. 556/456 |
| 4,482,656 A | 11/1984 | Nguyen et al. .............. 523/212 |
| 4,522,958 A | 6/1985 | Das et al. ................... 523/212 |
| 4,529,774 A | 7/1985 | Evans et al. ................ 524/860 |
| 4,652,470 A | 3/1987 | Das et al. ................. 427/407.1 |
| 4,677,044 A | 6/1987 | Yamazaki et al. ............ 430/58 |
| 4,844,980 A | 7/1989 | Grüning et al. ............. 428/405 |
| 5,021,091 A | 6/1991 | Takarada et al. ....... 106/287.16 |
| 5,304,243 A | 4/1994 | Yamaguchi et al. ........ 106/490 |
| 5,472,493 A | 12/1995 | Regan ....................... 106/491 |
| 5,514,734 A | 5/1996 | Maxfield et al. ............ 523/204 |
| 5,653,794 A | 8/1997 | Weber et al. ............... 106/442 |
| 5,686,012 A | 11/1997 | Hayashi et al. .......... 252/62.56 |
| 5,853,809 A | 12/1998 | Campbell et al. ........ 427/407.1 |
| 6,022,404 A | 2/2000 | Ettlinger et al. ............ 106/404 |
| 6,117,543 A | 9/2000 | Zaima et al. ............... 428/332 |
| 6,214,106 B1 | 4/2001 | Weber et al. ............... 106/442 |
| 6,790,904 B1 * | 9/2004 | White et al. ................ 524/588 |
| 2001/0006993 A1 * | 7/2001 | Ring et al. .................. 524/599 |
| 2002/0086168 A1 | 7/2002 | Sadvary et al. |
| 2004/0209088 A1 * | 10/2004 | Retsch et al. ............... 428/447 |

FOREIGN PATENT DOCUMENTS

JP     410025427 A   *   1/1998

* cited by examiner

*Primary Examiner*—Tae H. Yoon
(74) *Attorney, Agent, or Firm*—Diane R. Meyers; Donald R. Palladino

(57) ABSTRACT

Powder coating compositions having improved mar and scratch resistance are disclosed. The coatings generally comprise one or more particles that have been modified to render the particles more surface active. The improved resistance is achieved without affecting the appearance or mechanical performance of the coatings. Methods for using the coatings, and the substrates coated therewith, are also disclosed.

18 Claims, 1 Drawing Sheet

COATING COMPOSITIONS WITH MODIFIED PARTICLES AND METHODS OF USING THE SAME

FIELD OF THE INVENTION

The present invention relates to powder coating compositions that provide improved mar and/or scratch resistance and to methods for using the same. More specifically, the improved resistance is achieved by adding modified particles to a film-forming resin.

BACKGROUND OF THE INVENTION

"Color-plus-clear" coating systems involving the application of a colored or pigmented basecoat to a substrate followed by application of a transparent or clear topcoat over the basecoat have become increasingly popular as original finishes for a number of consumer products including, for example, cars and floor coverings such as ceramic tiles and wood flooring. The color-plus-clear coating systems have outstanding appearance properties, including gloss and distinctness of image, due in large part to the clear coat.

"One coat" systems comprising a one coat color layer are applied themselves as the topcoat. One coat systems are frequently used for household appliances, lawn and garden equipment, interior fixtures, and the like.

In recent years, powder coatings have become increasingly popular; because these coatings are inherently low in volatile organic content (VOC), their use significantly reduces air emissions during the application and curing processes.

Topcoat film-forming compositions, such as the protective and/or decorative one coats for household appliances and the transparent clearcoat in color-plus-clear coating systems for automotive applications, are subject to defects that occur during the assembly process and damage from both the environment and normal use of the end product. Paint defects that occur during assembly include the paint layer being too thick or too thin, "fish eyes" or craters, and under-cured or over-cured paint; these defects can affect the color, brittleness, solvent resistance and mar and scratch performance of the coating. Marring and/or scratching can also occur during assembly due to handling of the parts, and particularly during transit of the parts to the assembly plant. Damaging environmental factors include acidic precipitation, exposure to ultraviolet radiation from sunlight, high relative humidity and high temperatures; these factors can also result in compromised performance. Normal use of consumer products will often lead to marring, scratching and/or chipping of the surface due to contact with hard objects, contact with brushes and/or abrasive cleansers during normal cleaning processes, and the like.

Thus, there is a need in the coatings art for topcoats having good scratch and mar resistance.

SUMMARY OF THE INVENTION

The present invention is directed to powder coating compositions generally comprising a film-forming resin in which is dispersed a plurality of chemically modified particles. Particles containing at least one reactive group on their surface are suitable for modification, which is effected by the addition of a moiety that renders the particles more surface active than they would be otherwise; stated another way, the surface tension of the particles is lowered by the present modifications. As a result, the modified particles are more incompatible with the resin than their unmodified counterparts; this is contrary to many art-taught techniques in which particles are treated or reacted with compounds that make them more compatible with, and therefore more easily dispersed in, the resin. Rendering the present particles more incompatible or more surface active causes at least some of the particles to rise to the surface of the cured coating, thus affording enhanced mar and/or scratch resistance.

The particles are typically organic or inorganic particles, or mixtures thereof, and can have an average particle size in the nanometer or micron range. Methods for using compositions comprising modified particles are also within the scope of the invention, as are substrates coated according to these methods.

It has been surprisingly discovered that the incorporation of the present modified particles into a film-forming resin results in coatings having enhanced mar and/or scratch resistance as compared with the same coatings lacking these particles. According to the present invention, coatings can be formulated with these improved mar and/or scratch characteristics without adversely affecting the appearance or other mechanical properties of the coatings.

"Mar" and "scratch" refer herein to physical deformations resulting from mechanical or chemical abrasion. "Mar resistance" is a measure of a material's ability to resist appearance degradation caused by small scale mechanical stress. "Scratch resistance" is the ability of a material to resist more severe damage that can lead to more visible, deeper or wider trenches. Thus, scratches are generally regarded as being more severe than what is referred to in the art as mar, and the two are regarded in the art as being different. As noted above, mar and scratch can result from manufacturing and environmental factors as well as through normal use. Although mar and scratch are in many respects just differing degrees of the same thing, a coating that improves mar resistance may not be effective in improving scratch resistance, and vice versa. It will be appreciated, therefore, that combinations of modified and unmodified particles and other additives can be employed to give the final coating its desired characteristics. For example, one particle that offers particularly good mar resistance can be coupled with one that offers particularly good scratch resistance. In another example, a treated nanoparticle and an untreated microparticle can be combined to give the desired end performance.

DESCRIPTION OF THE INVENTION

Figure 1A:
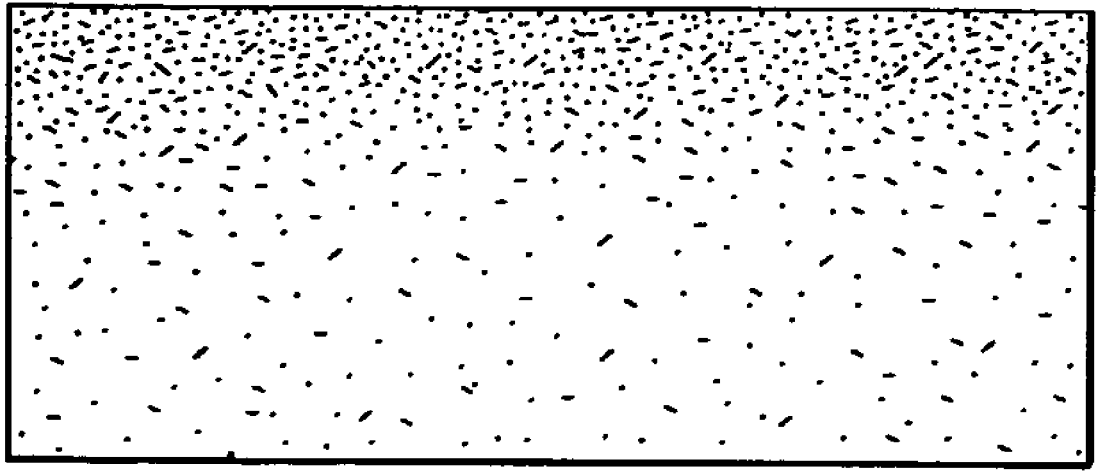
FIG. 1 depicts the dispersion of chemically modified particles in the coatings of the present invention, wherein the particles are concentrated in the surface region (FIG. 1A) and evenly dispersed throughout the surface region and bulk region (FIG. 1B).

The present invention is directed to a powder coating composition comprising a film-forming resin and a plurality of particles dispersed in the resin. The particles have been chemically modified to lower their surface tension. The surface tension of the modified particles is lower than the surface tension of the film-forming resin when cured without the particles. As a result, at least some of the particles migrate to the surface of the coating when the film in which they are deposited is cured. These particles remain at the surface after curing, while other modified particles remain dispersed throughout the bulk as shown, for example, in FIG. 1. It is believed that this surface migration imparts superior mar and/or scratch resistance to the cured coatings, although the inventors do not wish to be bound by this mechanism.

Any resin that forms a film can be used according to the present methods, absent compatibility problems. A particularly suitable resin for use in the present powder compositions is one formed from the reaction of a polymer having at least one type of reactive functional group and a curing agent having functional groups reactive with the functional group of the polymer. The polymers can be, for example, acrylic, polyester, polyether or polyurethane, and can contain functional groups such as hydroxyl, carboxylic acid, carbamate, isocyanate, epoxy, amide and carboxylate functional groups.

The use in powder coatings of acrylic, polyester, polyether and polyurethane polymers having hydroxyl functionality is known in the art. Monomers for the synthesis of such polymers are typically chosen so that the resulting polymers have a glass transition temperature ("$T_g$") greater than 50° C. Examples of such polymers are described in U.S. Pat. No. 5,646,228 at column 5, line 1 to column 8, line 7, incorporated by reference herein.

Acrylic polymers and polyester polymers having carboxylic acid functionality are also suitable for powder coatings. Monomers for the synthesis of acrylic polymers having carboxylic acid functionality are typically chosen such that the resulting acrylic polymer has a $T_g$ greater than 40° C., and for the synthesis of the polyester polymers having carboxylic acid functionality such that the resulting polyester polymer has a $T_g$ greater than 50° C. Examples of carboxylic acid group-containing acrylic polymers are described in U.S. Pat. No. 5,214,101 at column 2, line 59 to column 3, line 23, incorporated by reference herein. Examples of carboxylic acid group-containing polyester polymers are described in U.S. Pat. No. 4,801,680 at column 5, lines 38 to 65, incorporated by reference herein.

The carboxylic acid group-containing acrylic polymers can further contain a second carboxylic acid group-containing material selected from the class of $C_4$ to $C_{20}$ aliphatic dicarboxylic acids, polymeric polyanhydrides, low molecular weight polyesters having an acid equivalent weight from about 150 to about 750, and mixtures thereof. This material is crystalline and is preferably a low molecular weight crystalline or glassy carboxylic acid group-containing polyester.

Also useful in the present powder coating compositions are acrylic, polyester and polyurethane polymers containing carbamate functional groups. Examples are described in WO Publication No. 94/10213, incorporated by reference herein. Monomers for the synthesis of such polymers are typically chosen so that the resulting polymer has a high $T_g$, that is, a $T_g$ greater than 40° C. The $T_g$ of the polymers described above can be determined by differential scanning calorimetry (DSC).

Suitable curing agents generally include blocked isocyanates, polyepoxides, polyacids, polyols, anhydrides, polyamines, aminoplasts and phenoplasts. The appropriate curing agent can be selected by one skilled in the art depending on the polymer used. For example, blocked isocyanates are suitable curing agents for hydroxy and primary and/or secondary amino group-containing materials. Examples of blocked isocyanates are those described in U.S. Pat. No. 4,988,793, column 3, lines 1 to 36, incorporated by reference herein. Polyepoxides suitable for use as curing agents for COOH functional group-containing materials are described in U.S. Pat. No. 4,681,811 at column 5, lines 33 to 58, incorporated by reference herein. Polyacids as curing agents for epoxy functional group-containing materials are described in U.S. Pat. No. 4,681,811 at column 6, line 45 to column 9, line 54, incorporated by reference herein. Polyols, materials having an average of two or more hydroxyl groups per molecule, can be used as curing agents for NCO functional group-containing materials and anhydrides, and are well known in the art. Polyols for use in the present invention are typically selected such that the resultant material has a $T_g$ greater than about 50° C.

Anhydrides as curing agents for epoxy functional group-containing materials include, for example, trimellitic anhydride, benzophenone tetracarboxylic dianhydride, pyromellitic dianhydride, tetrahydrophthalic anhydride, and the like as described in U.S. Pat. No. 5,472,649 at column 4, lines 49 to 52, incorporated by reference herein. Aminoplasts as curing agents for hydroxy, COOH and carbamate functional group-containing materials are well known in the art. Examples of such curing agents include aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The film-forming resin described above is generally present in the present powder coating compositions in an amount greater than about 50 weight percent, such as greater than about 60 weight percent, and less than or equal to 95 weight percent, with weight percent being based on the total weight of the composition. For example, the weight percent of resin can be between 50 and 95 weight percent. When a curing agent is used, it is generally present in an amount of up to 30 weight percent; this weight percent is also based on the total weight of the coating composition.

Any combination of organic or inorganic particles having a functional group can be modified and added to the resin according to the present invention. Examples of particles include but are not limited to silica; various forms of alumina; alumina silicate; silica alumina; alkali aluminosilicate; borosilicate glass; oxides including titanium dioxide and zinc oxide; quartz; and zircon such as in the form of zirconium oxide. Particles that do not have an active site can be activated by reacting the particles with water. In the reaction with water, the Si—O—Si bonds on the particle surface will break and, upon the addition of the water molecule, two Si—OH groups will be formed. Examples of particles that need to be activated include nitrides, including boron nitride and silicon nitride; nepheline syenite; buddeluyite; and eudialyte. Mixtures of any of the above particles can be used. In one embodiment, the particles in the coating compositions comprise only one kind of metal oxide.

The silica can be in any suitable form, such as crystalline, amorphous, fused, or precipitated. A silica particle having one or more surface silanol groups is particularly suitable for use in the present invention. For example, the silica particles can have between about 0.5 and 4 mmol surface OH/g of particles.

Alumina can be used in any of its forms, such as alpha, beta, gamma, delta, theta, tabular alumina, and the like. Fused or calcined alumina, including ground or unground calcined alumina, can also be used, but will typically require activation with water first.

The particles listed above are widely commercially available. For example, crystalline silica is available from Reade Advanced Materials; amorphous and precipitated silica from PPG Industries, Inc.; ZEEOSPHERES, silica alumina ceramic alloy particles, from 3M Corporation; colloidal silica from Nissan Chemicals; silica alumina, such as G200, G-400, G-600, from 3M Corporation; alkali alumina silicate, such as W-210, W-410, and W-610, from 3M Corporation; borosilicate glass, sold as SUNSPHERES, from MoSci Corporation; and quartz and nepheline syenite from Unimin, Inc. Other alumina products are available from Micro Abrasives Corporation as WCA3, WCA3S, and WCA3TO, and from Alcoa as TE4-20. Zircon, buddeluyite and eudialyte are commercially available from Aran Isles Corporation, and boron nitride is available from Carborundum Inc. as SHP-605 and HPP-325. It will be appreciated that many commercially available products are actually composites or alloys of one or more materials; such particles are equally within the scope of the present invention.

There are treated particles reported in the art in which the particle is "associated with" one or more coupling agents that affect the properties of the particle. In contrast, the particles used according to the present invention are actually chemically modified by their reaction with a compound having a surface-active moiety; "chemically modified" refers to this reaction. This compound chemically attaches to the surface of the particle by reacting with one or more of the functional groups on the particle. Significantly, the chemical modifications made to particles according to the present invention will be irreversible when used in the present coatings. This is another distinction over modified particles known in the art, whose modifying moieties can subsequently be removed from the particles during normal use. In addition, the modified particles of the present invention can be formulated to retain their quality as individual particles, that is, they do not clump or agglomerate after modification when incorporated into a powder coating. This represents a significant advance in powder coatings, as liquid additives, for example unmodified colloidal silica, can cause clumping in the powder formulations.

Compounds having a surface-active moiety and a group that will react with the functional group of the particle should therefore be used. These compounds can have the general Formula 1:

$$F-L-Z \quad (1)$$

wherein F is the moiety containing one or more functional groups that will react with the particle surface, Z is a surface-active moiety that decreases the surface tension of the particle, and L is a group that links F and Z. "Surface active" as used herein refers to any compound or moiety that, when attached to the particles used herein, lowers the solid surface tension or surface energy of the particle.

Surface activity can be measured by contact angle measurements or by measuring surface tension (surface tension is inversely proportional to surface activity). The surface tension of an unmodified particle can be compared to the surface tension of the same particle but having a modifying group as described herein. If the modified particle has a lower surface tension than its unmodified counterpart, then it can be concluded that the moiety attached to the particle decreased the surface tension of the particle and is therefore within the scope of the invention. All of the surface tension measurements relevant to the present invention can be done by any means known in the art, such as the Owens-Wendt method using a Rame-Hart Contact Angle Goniometer, the use of which will be familiar to those skilled in the art.

Examples of compounds within general Formula 1 that can be reacted with the present particles to render them more surface active can be represented by Formula 2:

$$Si(OR)_3-(CH_2)_n-Z \quad (2)$$

wherein R is an alkyl moiety having 1 to 30 carbons, such as 1 or 2 carbons, Z is, as above, a moiety that decreases the surface tension of the particle to which it is attached, and n is 0, 1 or 2. In comparing Formula 1 to Formula 2, F would be represented by $Si(OR)_3$, L would be represented by $(CH_2)_n$ and Z would, of course, be Z. "Alkyl" refers herein to carbon-containing groups having the specified number of carbon atoms, which groups can be cyclic or aliphatic, branched or linear, substituted or unsubstituted. When compounds having Formula 2 are prepared using hydrosilylation techniques, such as those described herein, "n" will generally be 2 or 3. It will be appreciated that at least one of the alkoxy groups attached to the Si molecule reacts with a functional group on the surface of the particle; in the case of silica particles, the alkoxy group reacts with a silanol group on the particle surface. In one embodiment, Z does not contain any aromaticity and in another embodiment, Z does not have a nitrogen group. The Z moiety can have no functional groups, or can have one or more functional groups. In one embodiment, two or more functional groups are present in the Z moiety. The functional groups, if present, can be selected, for example, based on their ability to react with the crosslinker used in the resin formation. This can provide retained mar and/or scratch resistance because the particle will covalently bond with the resin/crosslinker at the surface of the coating. For certain applications, such reaction may be undesirable and the Z moiety does not contain any functional or reactive group.

Any Z moiety can be used according to the present invention, and will generally fall into one of three categories: a long chain alkyl group; a fluorocarbon-containing material; and a silane to which is attached at least two methyl groups. "Long chain" as used in this context refers to four or more carbon atoms, and a fluorocarbon-containing material refers to a material comprising at least one $CF_3$ group. The long chain alkyl group can be linear or branched. The Z moiety can be introduced to the particle in any manner known in the art. For example, the Z moiety may be part of a compound that, by itself, reacts with the particle, (i.e. contains an F moiety) such as a compound that contains a trialkoxy silane.

Alternatively, a compound containing a Z moiety can be reacted with another compound that contains an F moiety. This can be done by any means known in the art, by selecting the appropriate L moiety to bring together the F and Z moieties. For example, a trialkoxy silane wherein the fourth substituent has a first functional group can be reacted with a compound containing both a "Z" moiety and a second functional group; the first and second functional groups are selected so as to be reactive with each other. Upon reaction, the F and Z moieties are united. Any pair of functional groups can be used. For example, if one functional group is an epoxy, the other can be an amine, a carboxylic acid or a hydroxy; if one functional group is an amine, the other can be an epoxy, isocyanate or carboxylic acid; if one functional group is an isocyanate, the other can be an amine or hydroxy; and if one functional group is an acrylate, the other can be an amine. Specific examples include the reaction of glycidyloxytrimethoxy propylsilane ("A-187") with a (di) alkylamine or A-187 with stearoyl sarcosine.

Examples of compounds having long alkyl chains are those within Formula 2, wherein Z is $—(CH_2)_{n1}—CH_3$, and $n_1$ is 1 to 30, such as 7 to 17. In this embodiment, the total of n and $n_1$ is three or greater. Specific examples include octyltrimethoxy silane, octyltriethoxy silane, and octadecyl triethoxy silane. In another particular embodiment within Formula 2 that introduces a long alkyl chain, Z is

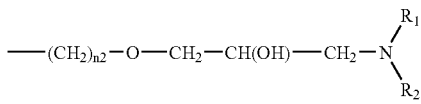

$n_2$ is 1 to 3 and $R_1$ and $R_2$ are the same or different and $R_1$ can be hydrogen or an alkyl group having 1 to 30 carbons and $R_2$ is an alkyl group having 4 to 30 carbons. For example, $R_1$ can be H and $R_2$ can be $C_6H_{13}$, $C_8H_{17}$ or $C_{12}H_{25}$, or both $R_1$ and $R_2$ can be $(C_4H_9)$. It will be appreciated that this embodiment also introduces functional groups into the "F-L-Z" compound.

Examples of compounds having fluorocarbon-containing moieties include but are not limited to those having Formula 2 above, wherein n is 1 or 2, Z is $—(CF_2)_m—CF_3$ and m is 0 to 30, such as 7. Perfluoro alkyl trialkoxy silanes fall within this category, such as perfluorooctyl triethoxy silane, fluoropropyltrimethoxy silane, and perfluorodecyl triethoxy silane.

Examples of compounds having dimethylsilane moieties include those of Formula 2, wherein n is zero, Z is $—(CH_2)_{n3}—(Si(CH_3)_2)—O)_{m1}—Si(CH_3)_3$, $n_3$ is 0 to 17, such as 2, and $m_1$ is 1 to 50, such as 1 to 10. It will be appreciated that the present invention is not limited to any of the examples listed above. In addition, combinations of F-L-Z compounds can be used so as to attach more than one kind of surface active moiety to the particle.

The modification of the present particles is performed by means standard in the art. If the particles do not have surface functionality, they are first treated with a small amount of water (i.e. about 1 percent) to activate the surface by formation of Si—OH groups on surface. The small amount of water used in the treatment will react with the particle and there will be substantially no water left. The particles having surface functional groups are reacted with the one or more silylating reagents at slightly elevated temperatures (i.e. about 60° C.) in the presence of a catalyst, such as dibutyltinlaurate, for about two hours. Typically, between about 0.1 and 5.0 weight percent of catalyst is added, such as 1 percent. Generally, between about 1 and 100 percent, such as between about 20 and 100 percent, of the surface functional groups on the particle will react with the silylating reagent. The "silylating reagent(s)" refers to the F, F-L, or F-L-Z compound, depending on how the reaction is performed, that is reacted with the particle. For example, an F or F-L containing compound can be reacted first with the particle, with the L-Z or Z containing compound added later. Alternatively, the F-L-Z compound can be reacted directly with the particle; this embodiment is typically more desirable as it provides a more stable particle. The silylating reagent can be added in amounts of 1, 5 or up to about 10 weight percent or even greater, with weight percent being based on the total weight of the silica.

In embodiments wherein a trifluoroalkyltrialkoxy silane compound is being reacted with the particle, for example, a trifluoroalkyl compound and trialkoxysilane compound can be reacted first, with the reaction product (i.e. the F-L-Z compound) being subsequently reacted with the particle. Alternatively, the particle can be reacted with the trialkoxy silane first, with the fluoro compound reacted onto the silane after it is attached to the particle.

The result of the present modification is to lower the surface tension of the particle being modified. According to the invention, the surface tension of the modified particles is lower than the surface tension of the film-forming resin into which they are placed. For purposes of comparing surface tensions of the particle and the resin, the surface tension of the cured film-forming resin is measured without the present particles or any other additives that would affect the surface tension reading; it is this surface tension measurement that is compared to the surface tension measurement of the modified particle itself. As a result of adding particles having a surface tension lower than that of the film-forming resin, the surface tension of the present compositions as a whole is also lowered. The present invention is therefore further directed to a method for lowering the surface tension of a cured coating by adding to the uncured coating composition a particle whose surface tension is lower than the surface tension of the cured coating without the particle.

Some of the particles that can be modified according to the present invention already contain some form of surface treatment applied by the supplier. Examples include MIBK-ST, which is a colloidal silica in MIBK solvent, and MEK-ST, a colloidal silica in MEK solvent, both of which are commercially available from Nissan. Such particles, however, typically have a surface tension higher than the surface tension of the film-forming resins useful for forming coatings. Indeed, these commercially available products do not appear to be capable of incorporation into powder coating compositions. The present modifications serve to lower the surface tension of the commercially available particles to levels that make them suitable for use in the present invention, regardless of whether the particles have already received some surface treatment from the supplier.

Figure 1B:
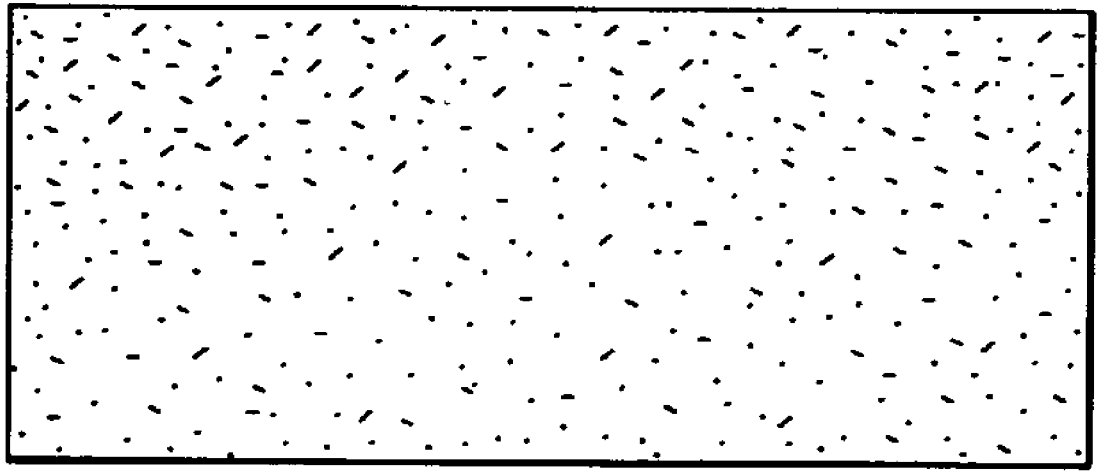

As a result of the lower surface tension, at least some of the present modified particles will migrate to the surface region of the coatings during curing and remain there after cure. The degree to which the particles migrate will depend upon a variety of factors including, but not limited to, the type of surface treatment, the type of resin, and other additives in the resin. In some embodiments, the surface region of the cured coating will have a higher concentration of particles than will the bulk region of the cured composition, as depicted in FIG. 1A. In other embodiments the surface-active particles will be more evenly dispersed throughout the surface region and bulk region as depicted in FIG. 1B; in this embodiment, it will be understood that a portion of the modified particles have migrated to the surface.

As discussed above, the migration of the present particles is a result of their having been modified with the F-L-Z compound. This compound serves to make the present particles more incompatible with the resin than they would be in their unmodified form. This novel approach is quite different from other modified particles known in the art, which are typically modified to make them more compatible with the resin, rather than less. Because they are compatibilized with the resin, they do not typically rise to the surface of the coating. These particles are made to have a surface tension higher than or as close as possible to that of the resin. In contrast, the surface tension of the present particles are made lower than the surface tension of the resin. Other particles reported in the art are designed to have functional groups that will bind the particles once dispersed throughout the resin; the particles are designed to "stay in" and react with the resin or crosslinker, and not migrate to the surface. When functional groups are included in the present particles, in contrast they do not bind with the resin until after they have migrated to the surface, and then only if the functional groups in the particles are reactive with the functional groups on the resin or crosslinker. Thus, the present particles are quite distinct from other particles reported in the art.

A "cured composition" will be understood as referring to one in which the components react with each other so as to resist melting upon heating. The "surface region" of a cured coating is used herein to refer to the top quarter of a coating. In contrast, the "bulk region" of the cured composition refers to that portion below the surface region, extending from the interface with the surface region to the substrate or to the next layer of coating beneath the cured coating containing the modified particles, generally about three quarters of the total coating thickness.

The concentration of particles can be determined, for example, by a variety of surface analysis techniques well known in the art, such as Transmission Electron Microscopy ("TEM"), Surface Scanning Electron Microscopy ("X-SEM"), Atomic Force Microscopy ("AFM"), and X-ray Photoelectron Spectroscopy, the use of which will be familiar to one skilled in the art. It will be apparent when looking, for example, at a micrograph of the present coatings, that at least some particles will have migrated to the surface region.

It should be understood that the particles can be present in the surface region such that a portion of the particles at least partially protrudes above the cured coating surface, essentially unprotected by an organic coating layer. Alternatively, the particles can be present in the surface region such that the particles are wholly covered by the resin.

The particles used in the present invention can have an average particle size ranging in the nanometer to microrange. "Nanoparticles" can be used in a size range of between about 2.0 and 500 nanometers, such as between about 5 and 200 nm. "Microparticles" can be used in a size range of between about 0.5 and 50 microns, such as 0.5 to 10 microns, or 0.5 to 5.0 microns. Any of the particles listed above can be used in any size within these ranges according to the present invention.

Particle size can be determined according to any method known in the art, such as by a conventional particle size analyzer. For example, where the average particle size is greater than 1 micron, laser scattering techniques can be employed, and for average particle sizes smaller than 1 micron, TEM can be used.

The shape or morphology of the particles can vary depending on the type of particle or particles selected. For example, generally spherical particles, such as crystalline materials, solid beads, microbeads, or hollow spheres, can be used, as can particles that are platy, cubic or acicular (that is, elongated or fibrous). The particles can also have a random or nonuniform morphology. In addition, the particles can have an internal structure that is hollow, porous or void free, or any combination, such as a hollow center with porous or solid walls. It will be appreciated that for certain applications, one particle shape may be more suitable than others. Particle shape may be irrelevant, however, for other applications. It will be appreciated that combinations of particles having different morphologies can be used to give the desired characteristics to the final coating.

Combinations of particles can also be used to impart the desired level of mar and/or scratch resistance to a coating. For example, nanosized particles that are particularly good for imparting mar resistance and microparticles that are particularly good for imparting scratch resistance can be combined. To determine whether improved mar and scratch resistance is obtained with a particular particle or combination of particles, two coating compositions can be formulated, with the only difference being that one contains the present modified particles and one does not. The coatings can be tested for mar and scratch resistance (i.e. "mar and/or scratch testing" by any means standardly known in the art, such as those described in the Example section below. The results for the particle-containing and nonparticle-containing compositions can be compared to determine whether improved resistance is obtained when the selected particles are added. Even a small improvement in any of these tests constitutes an improvement according to the invention. Accordingly, the present compositions, when cured, will have greater mar and/or scratch resistance than their particle-lacking counterparts. Gloss retention percentages of 20 percent or greater, 50 percent or greater, or even 70 percent or greater can be achieved according to the present invention.

The particles are typically present in the curable coating composition of the present invention in an amount ranging from 0.01 to 20.0 weight percent, such as an amount ranging from 0.01 to 10 weight percent, and often are present in an amount ranging from 0.01 to 8 weight percent based on total weight of the coating composition. For clear topcoats where appearance is important, a weight percent of between about 0.1 and 5.0 is particularly suitable, while for pigmented systems 4.0 to 12 weight percent is particularly suitable. It will be appreciated that improvement in mar and scratch resistance will increase as the concentration of particles increases. The tests described in the Example section below can be used by those skilled in the art to determine what weight percent or "load" of particles will give the desired level of protection.

Both the size of the particles used as well as the particle load can affect not only the level of mar and/or scratch resistance but also the appearance of the cured coating. Thus, particle size and load should be optimized by the user based on the particular application, taking into account, for example, the level of acceptable haze, the level of mar and/or scratch resistance, the thickness of the coating and the like. Where appearance is particularly relevant, such as in an automotive clear coat, a relatively low load and particle size can be used. A load of less than 5 weight percent, even less than 1 weight percent and a particle size between about 3 to 6 microns is particularly suitable. For industrial one-coat systems where haze is not as relevant, or where other pigments are present, loadings of up to about 10 percent or even higher can be used, as can particle sizes of 10 microns or even larger. One skilled in the art can optimize particle size and load to achieve the desired level of mar and/or scratch resistance without compromising the appearance or other mechanical properties of the cured coatings. Mixtures of particles having different sizes may be particularly suitable for a given application. Also, mixtures of treated and untreated particles may provide a suitable blend of mar and/or scratch resistance and appearance.

Haze can also be minimized to at least some degree by selecting resins and particles that have a similar refractive index ("RI"), that is the difference between the resin RI and the particle RI ("$\Delta$ RI") is minimized. In some applications, such as for clear coats, the $\Delta$ RI can be less than one, or even less than 0.1. Using a combination of particles having different RI's can also help to reduce haze. Minimizing $\Delta$ RI is particularly relevant when the particles are larger in size (i.e. greater than about 6 microns) and/or the particle load is greater than about 2 weight percent, such as greater than about 8 weight percent.

The powder coating compositions of the present invention may optionally contain additives such as waxes for flow and wetting, flow control agents, such as poly(2-ethylhexyl) acrylate, degassing additives such as benzoin and MicroWax C, adjuvant resin to modify and optimize coating properties, antioxidants, ultraviolet (UV) light absorbers and catalysts. Examples of useful antioxidants and UV light absorbers include those available commercially from Ciba-Geigy under the trademarks IRGANOX® and TINUVIN®. These optional additives, when used, are typically present in amounts up to 20 percent by weight, based on total weight of the coating.

The particles of the present invention can be added at any time during the formulation of the powder coating. For example, curable powder coating compositions of the present invention can be prepared by first dry blending the film-forming resin, the plurality of particles, and any of the additives described above, in a blender, such as a Henschel blade blender. The blender is operated for a period of time sufficient to result in a homogenous dry blend of the materials. The blend is then melt blended in an extruder, such as a twin screw co-rotating extruder, operated within a temperature range sufficient to melt but not gel the components. The melt blended curable powder coating composition is typically milled to an average particle size of from, for example, 15 to 80 microns. Other methods known in the art can also be used.

Alternatively, the present powder compositions can be prepared by blending and extruding the ingredients as described above, but without the present particles. The particles can be added as a post-additive to the formulation, such as through a second extrusion process or by simply mixing the particles into the blended composition, such as by shaking them together in a closed container or using a Henschel mixer. The manner of formulating the present compositions can therefore be determined by one skilled in the art depending on the application and desired parameters of the user.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils, usually about 2 to 4 mils. Other standard methods for coating application can be employed such as brushing, dipping or flowing.

Generally, after application of the coating composition, the coated substrate is baked at a temperature sufficient to cure the coating. Metallic substrates with powder coatings are typically cured at a temperature ranging from 230° F. to 650° F. for 30 seconds to 30 minutes.

The coating compositions of the invention can be applied to a variety of substrates, for example automotive substrates such as fenders, hoods, doors and bumpers, and industrial substrates such as household appliances, including washer and dryer panels and lids, refrigerator doors and side panels, lighting fixtures and metal office furniture. Such automotive and industrial substrates can be metallic, for example, aluminum and steel substrates, and non-metallic, for example, thermoplastic or thermoset (i.e. "polymeric") substrates including, for example, transparent plastic substrates, polycarbonate, and polymethyl methacrylate and elastomeric substrates such as thermoplastic polyolefin. Wood substrates are also suitable for coating with the present compositions.

The coating compositions of the invention are particularly useful as top coats and/or clear coats in color-clear composite coatings. The compositions of the invention in the pigmented form can be applied directly to a substrate to form a color coat. Alternately, the coating composition of the invention can be unpigmented, in the form of a clearcoat for application over a color coat (either a primer coat or a colored topcoat). When used as a color topcoat, coating thicknesses of about 0.5 to 5.0 mils are usual, and when used as a clearcoat, coating thicknesses of about 1.0 to 4.0 mils are generally used.

Accordingly, the present invention is further directed to a substrate coated with one or more of the present compositions. The substrates and compositions, and manner of applying the same, are as described above.

The present invention is further directed to a multi-layer composite coating composition comprising a base coat deposited from a film-forming composition and a topcoat applied over at least a portion of the base coat, where the topcoat is deposited from any of the coating compositions of the present invention. The base coat might have a cured film thickness between about 0.5 to 4 mils while the topcoat cured film thickness can be up to 10 mils. The base coat can be cured before application of the topcoat, or the two coats can be cured together. In one example, the base coat can be deposited from a pigmented film-forming composition, while the topcoat formed from the present compositions is substantially transparent. This is the color-plus-clear system discussed above, frequently used in automotive applications. In another example, more than one of the layers can contain the particles of the present invention.

In yet another embodiment, the present invention is directed to a method for improving the mar and/or scratch resistance of a coated substrate comprising applying the present compositions to at least a portion of the substrate. Application can be by any means known in the art to the thicknesses described above.

The coatings formed according to the present invention, when cured, can have outstanding appearance properties and scratch and mar resistance properties as compared to no particles being present.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

For all of the Examples, unless otherwise noted, 20° gloss was measured with a handheld 20° NOVO-GLOSS 20 statistical glossmeter, available from Gardener Instrument Company, Inc.

BON AMI Mar Resistance ("BON AMI") was performed using an Atlas AATCC Mar Tester Model CM-5, available from Atlas Electrical Devices Co. of Chicago, Ill. Using a felt cloth clamped to the acrylic finger on the arm of the instrument, a set of 10 double rubs (unless indicated otherwise) was run on each panel, which was coated with BON AMI cleanser. The panel was then rinsed with cool tap water and dried. Mar resistance was expressed as a percentage of the 20° gloss that was retained after the surface was marred by the mar tester. Mar resistance was measured as: Percent Mar Resistance=(Marred Gloss÷Original Gloss)×100.

1, 2, and 9μ 3M Abrasive Paper Scratch Resistance ("1, 2 or 9μ Paper") also was performed using the Atlas Tester. A 2"×2" piece of the 3M Abrasive Paper backed with the felt cloth was clamped to the acrylic finger on the arm of the instrument, and a set of 10 double rubs (unless indicated otherwise) was run on each panel. The panel was then rinsed with cool tap water and dried. Scratch resistance was expressed as the percentage of the 20° gloss that was retained after the surface was scratched by the scratch tester. Scratch resistance was measured as: Percent Scratch Resistance=(Scratched Gloss÷Original Gloss)×100.

BYK Gardner haze was measured using the BYK/Haze Gloss Instrument following manufacturer's instructions.

Steel wool tests were also performed using the Atlas Tester ("steel wool") in the same manner as the scratch tests only using 2"×2" piece of the 0000# grade steel wool sheet backed with the felt cloth.

Steel wool ("scratch") tests were also performed using a light hammer (571 grams "light hammer") or heavy hammer (1381 grams "heavy hammer") wrapped with 0000# grade steel wool. Ten double rubs (unless indicated otherwise) were run on each panel. In some cases, the heavy hammer had a 1382 gram weight mounted on top ("double weight"). These tests were otherwise performed as described above for the scratch tests.

The Amtec Kistler Car Wash Test was performed by first applying and curing a colored coat and a clear coat to steel substrate panels. The panels were placed in the Amtec car wash machine from Amtec Kistler, Germany, which simulates car wash machines used in Europe. A moving platform transported the panels under a rotating polyethylene brush (two passes under the brush=one cycle) while a water/quartz meal mixture (silicon dioxide or quartz, 1.5 grams per liter) was sprayed at the panels. Twenty degree gloss meter readings were recorded before and after the test.

Results of these tests are presented in the tables below, both in terms of the gloss readings before and after the various tests, and as the percent gloss retention.

Example 1

Various surface tension measurements for various particles and coatings were performed as indicated in Table 1 to demonstrate the present invention. Contact angle measurements, both with water and methylene iodide, were made using the Rame-Hart Contact Angle Goniometer. Surface tension calculations were done using the Owens-Wendt method.

TABLE 1

| | Contact Angle ($H_2O$) | Contact Angle $CH_2I_2$ | Dispersive S.T. Dynes/cm | Polar S.T. Dynes/cm | Total S.T. Dynes/cm |
|---|---|---|---|---|---|
| MIBK-ST[1] | 36.3 | 22.5 | 35.5 | 17.2 | 52.7 |
| MIBK-ST + 5% Octyltriethoxy-silane (OTES)[2] | 93.5 | 41.5 | 38.4 | 0.5 | 38.9 |
| MIBK-ST + 5% fluorinated triethoxysilane[3] | 96 | 69 | 21.7 | 2.3 | 24 |
| Powder control[4] | 78 | 28.7 | 44.3 | 3.0 | 47.3 |
| Powder control + 5 wt % MIBK-ST | 77 | 29.8 | 45.2 | 3.5 | 48.7 |
| Powder control + 5 wt % Particle 14 | 85.3 | 38.2 | 39.2 | 2.1 | 41.3 |

TABLE 1-continued

| | Contact Angle ($H_2O$) | Contact Angle $CH_2I_2$ | Dispersive S.T. Dynes/cm | Polar S.T. Dynes/cm | Total S.T. Dynes/cm |
|---|---|---|---|---|---|
| Powder control + 5 wt % Particle 14 | 88.5 | 40.4 | 37.2 | 1.4 | 38.6 |

[1]30% nanoparticle solution in MIBK solvent; obtained from Nissan.
[2]nanoparticles identified as Particle 10, Table 2
[3]nanoparticles identified as Particle 11, Table 2
[4]Powder coating prepared according to Example 3, but lacking particles As seen in the table, the surface tension of the unmodified MIBK-ST (52.7) was higher than the surface tension of the cured powder coating lacking particle (47.3). The present modifications reduced the surface tension of the MIBK-ST from 52.7 to 38.9 and 24, for two different modifications. It will be noted that the surface tension measurements for the modified particles, 38.9 and 24, are lower than the surface tension measurements for the coatings lacking particle (47.3). These modified particles are therefore suitable for use with these powder resins. As further illustrated in the table, the addition of the present particles served to lower the surface tension of the cured coating; the surface tension was lowered from 47.3 to either 41.3 or 38.6, depending on the modification. In comparison, the unmodified particles having a surface tension of 52.7, when added to the powder control having a surface tension of 47.3, served to increase the surface tension of the cured coating containing the particles to 48.7.

Example 2

Five to 10 percent by weight of different types of micron-size silica particles (Particles 1–9 and 12) were first dispersed in MIBK dispersant, then reacted with 1 to 5 percent by weight of a surface-active alkoxysilane or siloxane oligomer having alkoxysilane functionality, in the presence of 1 to 2 weight percent dibutyltindilaurate (DBTDL) catalyst, for 2 to 6 hours, at 60° C., as indicated in Table 2. Particles 10 and 11, which are silica nanoparticles, were prepared in the same manner, but did not need to be dispersed in ketone first.

TABLE 2

| Particle | Treatment | Particle Type | Reaction Time (hrs) |
|---|---|---|---|
| 1 | Control (no particle) | GORESIL 25[5] | — |
| 2 | 5% Perfluorooctyltriethoxysilane | GORESIL 25 | 4 |
| 3 | 1% Perfluorooctyltriethoxysilane | GORESIL 25 | 6 |
| 4 | 1% Perfluorooctyltriethoxysilane | SUNSPHERES 05[6] | 4 |
| 5 | 5% Perfluorooctyltriethoxysilane | SUNSPHERES 05 | 6 |
| 6 | 5% Octyltriethoxysilane | GORESIL 25 | 6 |
| 7 | 5% ethylheptamethyldisiloxane-trimethoxy silane | GORESIL 25 | 4 |
| 8 | 5% Bis(2-dihydroxyethyl)-3-aminopropyltrimethoxysilane + 5% ethylheptamethyldisiloxanetri-methoxy silane | GORESIL 25 | 4 |
| 9 | 5% perfluorooctyltriethoxysilane + 5% reaction product of isocyanatopropyltrimethoxysilane and 4-hydroxy, 2,2,6,6 tetramethylpiperidine | GORESIL 25 | 4 |
| 10 | 5% octyltriethoxysilane | MIBK-ST | 6 |

TABLE 2-continued

| Particle | Treatment | Particle Type | Reaction Time (hrs) |
|---|---|---|---|
| 11 | 5% perfluorotriethoxysilane | MIBK-ST | 6 |
| 12 | 5% perfluorotriethoxysilane | NABLOX Alumina[7] | 6 |

[5]Silica particles, average particle size 2 microns, largest particle size 5 microns, from C.E.D Process Minerals, Inc.
[6]Fused quartz/borosilicate glass microspheres, average particle size 0.6 microns, from MoSci Corporation.
[7]NABLOX alumina, average particle size 1 micron, from Baikowski International.

Example 3

Samples 1 to 3 were prepared using the components and amounts in grams shown in Table 3 below. Briefly, the components were blended in a Henschel Blender for 60 to 90 seconds. The mixtures were then extruded through a Werner & Pfleider co-rotating twin screw extruder at a 450 RPM screw speed and an extrudate temperature of 85° C. to 125° C. The extruded material was then ground to a particle size of 17 to 55 microns using an ACM Grinder (Air Classifying Mill from Micron Powder Systems, Summit, N.J.). Cold rolled steel test panels coated with PPG Black Electrocoat primer ED5051 and fully cured, were obtained from ACT Laboratories. The finished powders were electrostatically sprayed onto test panels and subjected to the various tests listed in Table 3 in the manner described above. Numbers reported are the 20° gloss and the percent gloss retention.

TABLE 3

| Component/Test | Sample 1 | Sample 2 |
|---|---|---|
| Acrylic resin[8] | 526.0 | 526.0 |
| DDDA[9] | 115.5 | 115.5 |
| Benzoin[10] | 2.5 | 2.5 |
| MicroWax "C"[11] | 3.5 | 3.5 |
| TPTH[12] | 6.0 | 6.0 |
| Modaflow[13] | 6.0 | 6.0 |
| Particle 11 | — | 40 |
| Initial 20° gloss | 82.0 | 76.0 |
| Scratch (5x, light hammer) | 65.1 | 72.5 |
|  | 79.4% | 95.4% |
| 9 μ paper | 13.6 | 62.0 |
|  | 16.6% | 81.6% |
| 3 μ paper | 21.9 | 69.4 |
|  | 26.7% | 91.3% |
| 2 μ paper | 56.8 | 74.4 |
|  | 69.3% | 97.9% |
| BON AMI | 58.8 | 69.4 |
|  | 71.7% | 91.3% |

[8]GMA epoxy functional acrylic obtained from Anderson Development Company.
[9]Dodecanedioic acid used as a crosslinker
[10]Added as a degasser.
[11]Wax C Micro Powder, a fatty acid amide (ethylene bis-stearoylamide), commercially available from Hoechst-Celanese.
[12]Triphenyl tin hydroxide added as a catalyst.
[13]Modaflow, an acrylic copolymer flow additive anti-crater additive, commercially available from Solutia Inc.

As can be seen in Table 3, the coatings of the present invention (Sample 2) gave significantly better protection as compared with the control (Sample 1). Particle loading for Sample 2 was between 2 and 2.5 weight percent.

Example 4

Samples 3 through 7 were prepared as generally described in Example 3 using the components and amounts (in grams) shown in Table 4. Test panels were also prepared and tested as described in Example 3; results are shown in Table 4.

TABLE 4

| Component/Test | Sample 3 | Sample 4 | Sample 5 | Sample 6 | Sample 7 |
|---|---|---|---|---|---|
| Acrylic resin | 526.0 | 526.0 | 526.0 | 526.0 | 526.0 |
| DDDA | 115.5 | 115.5 | 115.5 | 115.5 | 115.5 |
| MicroWax "C" | 3.5 | 3.5 | 3.5 | 3.5 | 3.5 |
| TPTH | 6.0 | 6.0 | 6.0 | 6.0 | 6.0 |
| Modaflow | 6.0 | 6.0 | 6.0 | 6.0 | 6.0 |
| Benzoin | 2.5 | 2.5 | 2.5 | 2.5 | 2.5 |
| Particle 4 | — | 15 | — | — | — |
| Particle 2 | — | — | 15 | — | — |
| Particle 3 | — | — | — | 15 | — |
| Particle 5 | — | — | — | — | 15 |
| Initial gloss 20° | 82.8 | 82.6 | 79.5 | 79.0 | 80.7 |
| 9 μ paper | 21.6 | 16.5 | 20.7 | 19.0 | 19.5 |
|  | 26.1% | 20% | 26.0% | 24.0% | 24.2% |
| 3 μ paper | 33.4 | 34.1 | 51.2 | 38.2 | 34.8 |
|  | 40.3% | 41.3% | 64.4% | 48.4% | 43.1% |
| 2 μ paper | 62.4 | 64.2 | 74.3 | 68.7 | 65.8 |
|  | 75.4% | 77.7% | 93.5% | 87% | 81.5% |
| BON AMI | 64.2 | 71.0 | 78.1 | 71.2 | 73.6 |
|  | 77.5% | 86% | 98.2% | 90.0% | 91.2% |
| Scratch (5x, Light hammer) | 76 | 79.0 | 79.3 | 78.5 | 76.3 |
|  | 91.8% | 95.6% | 99.7% | 99.4% | 94.5% |
| Scratch (5x, Heavy hammer) | 74.6 | 79.0 | 78.6 | 78.4 | 77.8 |
|  | 90.1% | 95.6% | 98.9% | 99.2% | 96.4% |
| Scratch (5x, Heavy hammer, double weight) | 64.6% | 71.8 | 76.4 | 75.0 | 65.0 |
|  | 78.0% | 86.9% | 96.1% | 94.9% | 80.5% |

As can be seen from the above table, an improvement was observed in nearly all tests when using Samples 4 to 7 with the fluorine-modified particles, as compared with Sample 3 that had no particle added.

The particles represented approximately 2.2 weight percent of the total system.

Example 5

Microparticles treated according to the present invention were formulated into four different resin systems and tested as described above: a polyester with a hydroxyalkylamide crosslinker; a polyester having hydroxy functionality with a TGIC crosslinker; a polyester with an isocyanate crosslinker; and the GMA epoxy acrylic system described above in Example 4. Formulations (in grams) and results for Samples 8 through 19 are shown in Table 5. For each resin system there were two controls, one lacking particles, and one containing untreated particles.

As can be seen from Table 5, all of the samples wherein particles were added gave much better results than samples wherein no particles were added; treated GORESIL gave better performance than untreated GORESIL.

Example 6

Samples 20 and 21 were prepared using an acid functional polyester resin containing the components in the weights (in grams) shown in Table 6. The Samples were tested as described above, only using cold rolled steel panels with an iron phosphate pretreatment, obtained from ACT Laboratories. Samples 20 and 21 were formulated and tested in a pigment containing resin using the components and amounts (in grams) shown in Table 4, as described above. The pigment premix in the table below was prepared by admixing the following blend of pigments:

TABLE 5

|  | Sample 8 | Sample 9 | Sample 10 | Sample 11 | Sample 12 | Sample 13 | Sample 14 | Sample 15 | Sample 16 | Sample 17 | Sample 18 | Sample 19 |
|---|---|---|---|---|---|---|---|---|---|---|---|---|
| Polyester resin[14] | 615.9 | 615.9 | 615.9 | — | — | — | — | — | — | — | — | — |
| Crosslinker[15] | 53.6 | 53.6 | 53.6 | — | — | — | — | — | — | — | — | — |
| Modaflow | 6.6 | 6.6 | 6.6 | 5.52 | 5.52 | 5.52 | 6.8 | 6.8 | 6.8 | 6.0 | 6.0 | 6.0 |
| Benzoin | 4.5 | 4.5 | 4.5 | 3.4 | 3.4 | 3.4 | 5.5 | 5.5 | 5.5 | 2.5 | 2.5 | 2.5 |
| Anti-oxidant[16] | 9.7 | 9.7 | 9.7 | 6.9 | 6.9 | 6.9 | — | — | — | — | — | — |
| Anti-crater[17] | 8.2 | 8.2 | 8.2 | 7.0 | 7.0 | 7.0 | 5.45 | 5.45 | 5.45 | — | — | — |
| Particle 1 | — | 42 | — | — | 42 | — | — | 42 | — | — | 40 | — |
| Particle 3 | — | — | 42 | — | — | 42 | — | — | 42 | — | — | 40 |
| Polyester resin[18] | — | — | — | 635.1 | 635.1 | 635.1 | — | — | — | — | — | — |
| TGIC[19] | — | — | — | 47.8 | 47.8 | 47.8 | — | — | — | — | — | — |
| Polyester resin[20] | — | — | — | — | — | — | 451.7 | 451.7 | 451.7 | — | — | — |
| Crosslinker[21] | — | — | — | — | — | — | 222.5 | 222.5 | 222.5 | — | — | — |
| Catalyst[22] | — | — | — | — | — | — | 1.31 | 1.31 | 1.31 | — | — | — |
| MicroWax "C" | — | — | — | — | — | — | 6.59 | 6.59 | 6.59 | 6.0 | 6.0 | 6.0 |
| GMA Acrylic | — | — | — | — | — | — | — | — | 526.0 | 526.0 | 526.0 | |
| DDDA | — | — | — | — | — | — | — | — | — | 115.5 | 115.5 | 115.5 |
| TPTH | — | — | — | — | — | — | — | — | — | 6.0 | 6.0 | 6.0 |
| Initial 20° gloss | 87 | 80 | 72.5 | 92 | 85 | 74 | 89 | 81.4 | 63 | 82 | 76 | 62 |
| Scratch (10x, light hammer) | 32 / 37% | 62.7 / 78% | 69.6 / 96% | 27 / 29% | 80 / 94% | 72.6 / 98% | 54.7 / 61% | 78.7 / 97% | 59.8 / 95% | 61.8 / 75% | 74.6 / 98% | 66.0 / 106% |
| Scratch (5x, heavy hammer) | 51.4 / 59% | 64.9 / 81% | 67 / 92% | 60 / 65% | 78 / 92% | 74.5 / 101% | 63.2 / 71% | 77.3 / 95% | 59.1 / 94% | 68.4 / 83% | 73.5 / 97% | 65.5 / 106% |
| 9 μ paper | 16 / 18% | 9.4 / 12% | 16.4 / 23% | 16.3 / 18% | 23.8 / 28% | 22.9 / 31% | 12.8 / 14% | 21.5 / 26% | 26 / 41% | 21.3 / 26% | 21.2 / 28% | 31.9 / 51% |
| 3 μ paper | 15.1 / 17% | 14 / 18% | 29.1 / 40% | 17.8 / 19% | 18.1 / 21% | 35.7 / 48% | 22.4 / 25% | 33.9 / 42% | 28.2 / 45% | 22.7 / 28% | 31.8 / 42% | 44.9 / 72% |
| 2 μ paper | 44.8 / 52% | 45.9 / 57% | 64.8 / 89% | 54.6 / 59% | 66.1 / 78% | 71.7 / 97% | 55.7 / 63% | 70.0 / 86% | 59.5 / 94% | 60.6 / 74% | 59.7 / 79% | 67 / 108% |
| BON AMI | 14.3 / 16% | 19.1 / 24% | 17 / 23% | 12.5 / 14% | 16.3 / 19% | 25.5 / 34% | 15.9 / 18% | 29.8 / 37% | 17.9 / 28% | 55.3 / 67% | 60.0 / 80% | 34.2 / 55% |
| Steel wool (10x) | 10.7 / 12% | 45.0 / 56% | 68.1 / 94% | 14.4 / 16% | 77.2 / 91% | 73.9 / 100% | 24.1 / 27% | 62.8 / 77% | 59.6 / 95% | 29.0 / 35% | 73.4 / 97% | 65.2 / 102% |

[14]Polyester resin, commercially available from EMS AMERICAN GRILON INC. as GRILISTA P7372.
[15]Hydroxyalkylamide crosslinker, commercially available from EMS AMERICAN GRILON INC. as PRIMID XL-552.
[16]Anti-oxidant, commercially available from Ciba additives as IRGANOX 1076.
[17]Anti-crater additive, imide hydroxy urethane resin powder.
[18]Polyester resin having hydroxy functionality, commercially available from UCB Chemical as CRYLCOAT 450.
[19]Triglycidylisocyanurate, commercially available from CYTEC Corp.
[20]Polyester resin, commercially available from Reichhold Chemicals Inc as FINE-CLAD M-8025
[21]Crosslinker, commercially available from Creanova as VESTAGON BF 1540.
[22]Catalyst, commercially available from Estron Chemical as BUTAFLOW BT-71 ®

| | |
|---|---|
| GRILISTA P7337 | 1511.1 g |
| Phthalocyanine green (Fastolux 264-8143) | 104.0 g |
| Phthalocyanine green (Monolite Gr 860) | 112.8 g |
| Colortherm 10 yellow iron oxide | 102.3 g |
| Chrome oxide pigment | 639.0 g |

Briefly, the components were mixed in a Henschel Blender for 60 to 90 seconds. The mixtures were then extruded through a Werner & Pfleider co-rotating twin screw extruder at a 450 RPM screw speed and an extrudate temperature of 135° C.

TABLE 6

| | Sample 20 | Sample 21 |
|---|---|---|
| Polyester resin[23] | 453.3 | 453.3 |
| Pigment premix | 113.5 | 113.5 |
| Benzoin | 3.2 | 3.2 |
| TGIC | 38.1 | 38.1 |
| Crosslinker[24] | 18.7 | 18.7 |
| Flow additive[25] | 6.4 | 6.4 |
| Anti-oxidant[26] | 3.2 | 3.2 |
| MicroWax "C" | 4.4 | 4.4 |
| Catalyst[27] | 0.32 | 0.32 |
| Particle 12 | — | 40 |
| Initial gloss 20° | 82.4 | 76.5 |
| Scratch (10x, light hammer) | 43.5 52.8% | 67.5 88.2% |
| 9 μ paper | 11.6 14.1% | 11.2 14.6% |
| 3 μ paper | 17.4 21.1% | 28.9 76.5% |
| 2 μ paper | 46.1% 55.9% | 60.5 79.1% |
| BON AMI | 35.5 43.1% | 71.9 94.0% |
| Initial 20° | 82.0 | 74.7 |
| Steel wool (5x) | 19.9 24.3% | 71.1 95.2% |
| Steel wool (10x) | 15.0 18.3% | 72.2 96.7% |

[23] A polyester resin commercially available from UCB Chemical as GRILISTA P7337.
[24] Crosslinker, commercially available from Creanova as VESTAGON BF 1540.
[25] Flow additive, commercially available from Estron Chemical Inc PL-200.
[26] Anti-oxidant, commercially available from Ciba Additives as IRGANOX 1076.
[27] Catalyst, commercially available from Synthron as ACTIRON 32-057.

Sample 21 with Particle 12—fluorinated NABLOX—showed significant improvement over the control (Sample 20) in which no particles were added.

The particle loading in this example, due in part to the pigment system used, was between 5 and 10 percent. The pigment to binder ratio (P:B) was approximately 1:3, which is relatively low for a pigment bearing system.

Whereas particular embodiments of this invention have been described above for purposes of illustration, it will be evident to those skilled in the art the numerous variations of the details of the present invention may be made without departing from the invention as defined in the appended claims.

Therefore, we claim:

1. A powder coating comprising:
   a) a film-forming resin; and
   b) a plurality of particles dispersed in said resin, wherein the particles have been chemically modified, wherein a modification by attachment of a compound having (i) a surface-active moiety that lowers the solid surface tension of the particle, and (ii) a group that reacts with a functional group of the particle, to have a lower surface tension, thereby making the particles more incompatible with the film-forming resin than the particles would be without the modification.

2. The coating composition of claim 1, wherein the particles have been modified by attachment of a compound having the structure:

F-L-Z wherein F is a moiety comprising a functional group; Z is a moiety that decreases the surface tension of the particle to which it is attached; and L is a group that links F and Z.

3. The coating composition of claim 2, wherein L comprises the reaction product of an epoxy and an amine.

4. The coating composition of claim 1, wherein said particles are modified through the attachment of a compound having the structure:

$Si(OR)_3$—$(CH_2)_n$-Z wherein R is an alkyl group having 1 to 30 carbons; n is 0, 1 or 2; and Z is a moiety that decreases the surface tension of the particle to which it is attached.

5. The coating composition of claim 4, wherein Z comprises a long chain alkyl group.

6. The coating composition of claim 4, wherein Z comprises a fluorocarbon.

7. The coating composition of claim 1, wherein the particles have been chemically modified to have a surface tension of 50 dynes/cm or less.

8. The coating composition of claim 7, wherein the surface tension of said modified particles is 40 dynes/cm or less.

9. The coating of claim 1, wherein said particles are selected from silica, alumina, alkali alumina silicate, borosilicate glass, titanium dioxide, zinc oxide, quartz, nepheline syenite, zircon, buddeluyite, and eudialyte.

10. The coating of claim 9, wherein said silica is crystalline silica, amorphous silica, fumed silica, precipitated silica or mixtures thereof.

11. The coating of claim 1, wherein the particles are nanoparticles having an average particle size of between 2.0 and 500 nanometers.

12. The coating of claim 11, wherein the average particle size ranges between 5 and 200 nanometers.

13. The coating of claim 1, wherein the particles are microparticles having an average particle size of between 0.5 and 50 microns.

14. The coating of claim 13, wherein the average particle size ranges between 0.5 and 10 microns.

15. The coating of claim 1, wherein the weight percent of the particles is less than 20, with weight percent based on total weight of the composition.

16. The coating of claim 15, wherein the weight percent is between 0.01 and 10.

17. The coating of claim 16, wherein the weight percent is between 0.01 and 8.

18. A powder coating composition comprising:
   a) a film-forming resin; and
   b) a plurality of particles dispersed in said resin, wherein the particles have been modified to have a lower surface tension, thereby making the particles more incompatible with the film-forming resin than the particles would be without the modification.

* * * * *